(12) United States Patent
Tsai et al.

(10) Patent No.: US 11,860,117 B2
(45) Date of Patent: Jan. 2, 2024

(54) PH SENSOR AND REFERENCE ELECTRODE THEREOF

(71) Applicant: Luh Cherng Enterprise Co., Ltd., Kaohsiung (TW)

(72) Inventors: Wen-Feng Tsai, Kaohsiung (TW); Ke-Fu Lin, Kaohsiung (TW)

(73) Assignee: LUH CHERNG ENTERPRISE CO., LTD., Kaohsiung (TW)

( * ) Notice: Subject to any disclaimer, the term of this patent is extended or adjusted under 35 U.S.C. 154(b) by 82 days.

(21) Appl. No.: 17/652,711

(22) Filed: Feb. 28, 2022

(65) Prior Publication Data

US 2023/0273141 A1    Aug. 31, 2023

(51) Int. Cl.
*G01N 27/30* (2006.01)
*G01N 27/403* (2006.01)
*G01N 27/416* (2006.01)
*G01N 27/36* (2006.01)

(52) U.S. Cl.
CPC ........... *G01N 27/301* (2013.01); *G01N 27/36* (2013.01); *G01N 27/4035* (2013.01); *G01N 27/4167* (2013.01)

(58) Field of Classification Search
CPC .. G01N 27/301; G01N 27/36; G01N 27/4167; G01N 27/302; G01N 27/4035
See application file for complete search history.

(56) References Cited

U.S. PATENT DOCUMENTS 4,012,308 A * 3/1977 Jerrold-Jones ..... G01N 27/4035
                                                      204/408

FOREIGN PATENT DOCUMENTS

DE        3100302 A1 * 12/1981 ............. G01N 27/30

OTHER PUBLICATIONS

EPO machine-generated English language translation of DE 3100302 A1, downloaded Jul. 13, 2023, patented Dec. 10, 1981.*

* cited by examiner

*Primary Examiner* — Alexander S Noguerola
(74) *Attorney, Agent, or Firm* — Allen, Dyer, Doppelt + Gilchrist, PA

(57) ABSTRACT

A pH sensor for detecting a pH of a sample includes a reference electrode and a glass electrode. The reference electrode includes a hollow tubular housing, and at least one water absorbing unit disposed in the housing and including a porous junction member configured to contact the sample, and a water absorbing member disposed on one side of the porous junction member that is opposite to the sample. The water absorbing member is made by soaking a superabsorbent polymer in potassium chloride solution. The glass electrode is inserted into the water absorbing member, and protrudes from the junction member toward the sample.

15 Claims, 2 Drawing Sheets

PH SENSOR AND REFERENCE ELECTRODE THEREOF

FIELD

The disclosure relates to a detecting instrument, more particularly to a pH sensor and a reference electrode thereof.

BACKGROUND

A pH sensor mainly includes a glass electrode, a reference electrode and a temperature compensation electrode. The potassium chloride currently used in the reference electrode includes liquid potassium chloride made from saturated potassium chloride solution, and solid potassium chloride made by soaking a wood block in saturated potassium chloride solution. However, the liquid potassium chloride easily oozes out, or the silver/silver chloride sensing element fails due to ionic contamination of the sample, resulting in shortening the service life of the reference electrode. Further, because the solid potassium chloride has to overcome tolerance between a housing of the reference electrode and the wood block, the production of the reference electrode is difficult, causing high production cost thereof. That is, various forms of the reference electrodes have their own drawbacks. Since the design of the reference electrode is relevant to the manufacturing cost, the service life, and the measurement-related performance of the pH sensor, it is necessary to find a solution for overcoming the aforesaid drawbacks.

SUMMARY

Therefore, an object of the present disclosure is to provide a reference electrode of a pH sensor that is simple to make and assemble and that has a long service life.

According to one aspect of this disclosure, a reference electrode of a pH sensor is configured to contact a sample, and includes a container unit and at least one water absorbing unit. The container unit includes a hollow tubular housing. The at least one water absorbing unit is disposed in the tubular housing, and includes a porous junction member configured to contact the sample, and a water absorbing member disposed on one side of the porous junction member that is opposite to the sample. The porous junction member and the water absorbing member contact each other at an interface. The water absorbing member is made by soaking a superabsorbent polymer in potassium chloride solution.

Another object of this disclosure is to provide a pH sensor that is simple to make and assemble and that has a long service life.

According to another aspect of this disclosure, a pH sensor for detecting a pH of a sample includes a reference electrode and a glass electrode. The reference electrode is configured to contact a sample, and includes a container unit and at least one water absorbing unit. The container unit includes a hollow tubular housing. The at least one water absorbing unit is disposed in the tubular housing, and includes a porous junction member configured to contact the sample, and a water absorbing member disposed on one side of the porous junction member that is opposite to the sample. The porous junction member and the water absorbing member contact each other at an interface. The water absorbing member is made by soaking a superabsorbent polymer in potassium chloride solution. The glass electrode is inserted into the water absorbing member, and protrudes from the junction member toward the sample.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
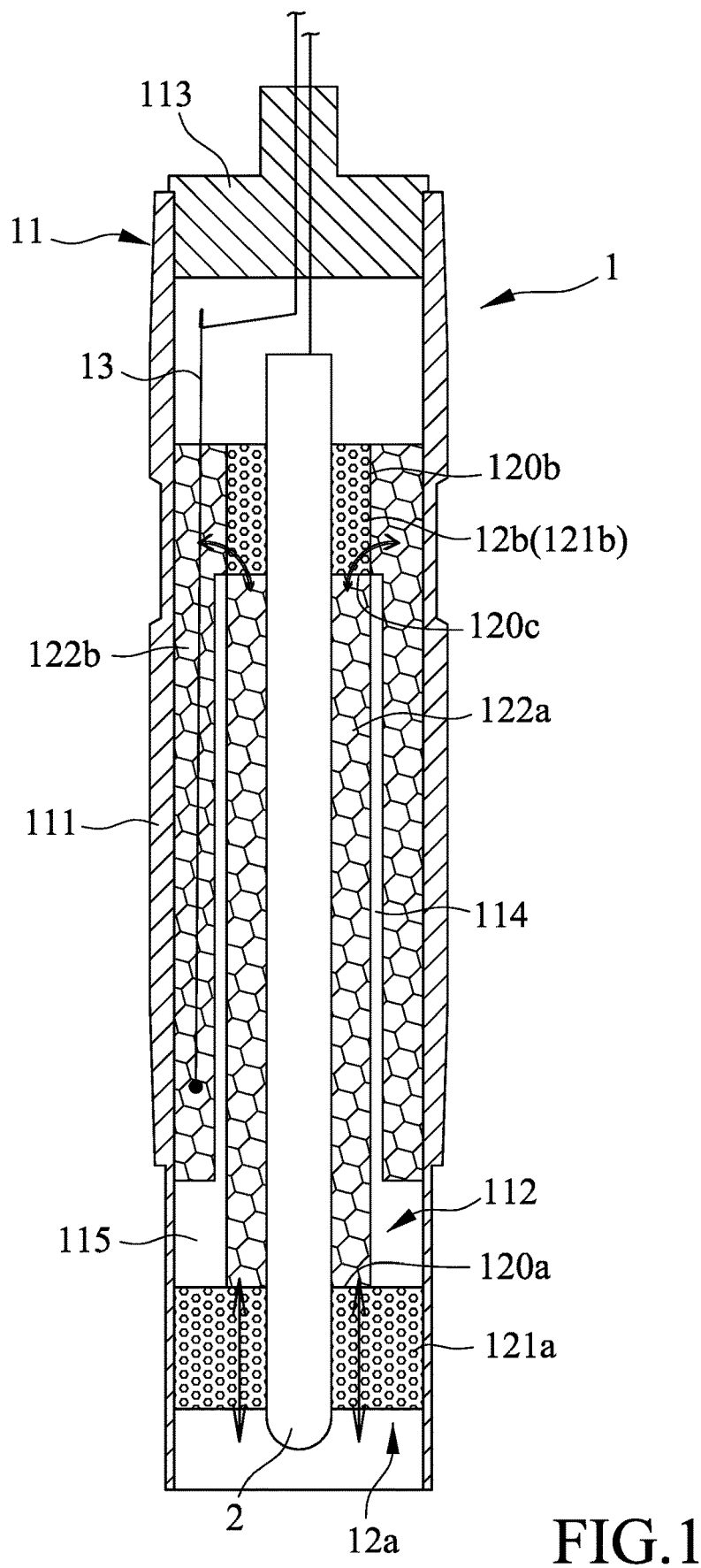
FIG. 1 is a sectional view of a pH sensor according to the first embodiment of the present disclosure.

Before the present disclosure is described in greater detail with reference to the accompanying drawings and embodiments, it should be noted herein that like elements are denoted by the same reference numerals throughout the disclosure.

Referring to FIG. 1, a pH sensor according to the first embodiment of the present disclosure is configured to detect a pH of a sample (not shown), and includes a reference electrode 1 configured to contact the sample, and a glass electrode 2 inserted into the reference electrode 1 and also configured to contact the sample. In this embodiment, the sample is a liquid sample.

The reference electrode 1 includes a container unit 11, two water absorbing units (12a, 12b), and a sensing element 13. The container unit 11 includes a hollow tubular housing 111 extending in a top-bottom direction, an inner tube 112 disposed in the housing 111 and having two opposite open ends, and a cover 113 covering a top end of the housing 111. The inner tube 112 has a support portion 114 extending in a same direction as the housing 111 and having a bottom side configured to face the sample, and an abutment portion 115 extending radially and outwardly from the bottom side of the support portion 114 and tightly abutting against an inner surface of the housing 111.

The water absorbing units (12a, 12b) are disposed in the housing 111 and are connected to each other. The water absorbing unit (12a) has a junction member (121a) abutting against the inner surface of the housing 111 in proximity to a bottom end thereof, and a water absorbing member (122a) disposed in the inner tube 112. The junction member (121a) and the water absorbing member (122a) are in contact with each other at an interface (120a). The abutment portion 115 of the inner tube 112 further abuts against a top end of the junction member (121a). The water absorbing unit (12b) has a junction member (121b) disposed on a top end of the water absorbing member (122a), and a water absorbing member (122b) inserted into the housing 111. The junction member (121b) and the water absorbing member (122b) are in contact with each other at an interface (120b). The junction member (121b) is further in contact with the top end of the water absorbing member (122a) at an interface (120c). The water absorbing member (122b) has a lower portion located between the inner surface of the housing 111 and an outer periphery of the inner tube 112, and an upper portion located between the inner surface of the housing 111 and an outer periphery of the junction member (121b). The junction member (121a, 121b) of each water absorbing unit (12a, 12b) is configured to contact the sample. The water absorbing members (122a, 122b) of the water absorbing units (12a, 12b) are not in contact with each other.

In this embodiment, the junction member (121a, 121b) of each water absorbing unit (12a, 12b) is a porous structure formed with a plurality of channels for ions to pass through, is usually made of sintered Teflon and potassium chloride, has sufficient acid and alkali resistance, and can be applied to samples having different pH levels. However, in other implementations of this embodiment, as long as a porous structure can be formed and the sample can be introduced as liquid, any type of the junction member (121a, 121b) is acceptable. On the other hand, the water absorbing member (122a, 122b) of each water absorbing unit (12a, 12b) is made by soaking superabsorbent polymer (SAP) in potassium chloride solution. The superabsorbent polymer is polyacrylate or polyacrylamide. Preferably, the powdered superabsorbent polymer is placed in a saturated potassium chloride solution, so that it will absorb the potassium chloride solution and expand into a jelly-like elastomer. After the superabsorbent polymer is saturated and no longer expands in volume, the making of each water absorbing unit (12a, 12b) is completed.

The sensing element 13 extends outwardly from the water absorbing unit (12b), and has one end inserted into the water absorbing member (122b). In this embodiment, the sensing element 13 is a silver/silver chloride (Ag/AgCl) wire that can output an electric potential. However, in other implementations of this embodiment, as long as electrical conductivity can be ensured and potential information can be output, any type of sensing element 13 is acceptable.

The glass electrode 2 is disposed in the housing 111 of the reference electrode 1, and is inserted into the junction member (121b) and the water absorbing member (122a), and extends out of the junction member (121a) for contact with the sample. In this embodiment, the glass electrode 2 further has a temperature compensation function. However, since the function of the glass electrode 2 is well known to those skilled in the art, a detailed description thereof is omitted herein for the sake of brevity.

In this embodiment, the inner tube 112 can be supported inside the housing 111 through tight abutment of the abutment portion 115 against the inner surface of the housing 111, and the water absorbing members (122a, 122b) can be supported through cooperation of the support portion 114 of the inner tube 112 with the housing 111 and the glass electrode 2, so that the overall structural strength of the first embodiment can be improved, thereby preventing the water absorbing members (122a, 122b) from being squeezed out or deformed due to an external force. The cover 113 can cover the top end of the housing 111 to delay evaporation of water contained in the water absorbing members (122a, 122b) so as to prolong the service life of the first embodiment.

Moreover, because the water absorbing members (122a, 122b) of the water absorbing units (12a, 12b) are made of elastic and soft superabsorbent polymers, there is no need to make each water absorbing member (122a, 122b) into a predetermined size in advance when making the first embodiment, it is only necessary to directly fill a sufficient amount of the superabsorbent polymers into the housing 111 of the container unit 11. The water absorbing members (122a, 122b) can close gaps among the housing 111, the inner tube 112 and the glass electrode 2 by their own elasticity, thereby ensuring tightness between the water absorbing members (122b) and the housing 111, between the water absorbing members (122a, 122b) and the inner tube 112, and between the water absorbing member (122a) and the glass electrode 2. As such, the tolerance problem caused by the manufacturing and assembling of the water absorbing members (122a, 122b) can be reduced, so that the assembly yield of the first embodiment can be effectively improved, the material cost can be minimized, and the labor cost can be reduced due to convenience of the assembly.

In use, the junction member (121a) and the lower portion of the glass electrode 2 are soaked in the liquid sample, so that anions and water molecules in the liquid sample can pass through the porous junction member (121a) and reach the interface (120a). Next, since there is no gap between the water absorbing members (122b) and the housing 111, between the water absorbing members (122a, 122b) and the inner tube 112, and between the water absorbing member (122a) and the glass electrode 2 for the anions to pass through, and since the water absorbing members (122a, 122b) are in a saturated state that neither absorbs nor allows anions to pass through, the anions of the liquid sample are blocked by the water absorbing member (122a) and stay in the interface (120a). Even if there is a gap between the water absorbing members (122b) and the housing 111, between the water absorbing members (122a, 122b) and the inner tube 112, and between the water absorbing member (122a) and the glass electrode 2 due to assembly errors, the water absorbing member (122b) can prevent the anions of the liquid sample from contacting the sensing element 13, so that the anions stay in the interface (120b). With the interfaces (120a, 120b) and the water absorbing members (122a, 122b) serving as two lines of defense, the sensing element 13 is prevented from being contaminated and from failure, so that the service life of the first embodiment can indeed be prolonged.

Subsequently, the water molecules of the sample will continue to pass through the interface (120a), the water absorbing member (122a), the interface (120c), the junction member (121b), the interface (120b) and the water absorbing member (122b) in sequence, so that the reference electrode 1 can provide a stable reference potential. Furthermore, since the superabsorbent polymer has high hydrophilicity and high water retention, and is insoluble in water, the water absorbing members (122a, 122b) can retain sufficient water for a long time and not easy to dry up, and can be maintained in an elastic solid state, thereby prolonging the service life and the storage period of the first embodiment.

Moreover, since the superabsorbent polymer is electrically neutral and has high absorption, and since the water absorbing members (122a, 122b) will not absorb other ions, compared with the prior art, in which the solid potassium chloride has lower potassium chloride content due to poor absorption of the wood blocks and the liquid potassium chloride is easily penetrated by other ions, the water absorbing members (122a, 122b) of this disclosure contain large amount of high purity potassium chloride, so that the water absorbing members (122a, 122b) have low impedance and fast conveying speed. Therefore, the first embodiment will not be easily affected by other ions, the error in measurement is low, and the reaction speed is fast.

It should be noted that the measurement principle of the glass electrode 2 is the same as that of a conventional pH sensor, and since the measurement principle of the glass electrode 2 is well known to those skilled in the art, a detailed description thereof is omitted herein for the sake of brevity. Further, the number of the water absorbing unit (12a, 12b) is not limited to two, and may be one. Even if the number of the water absorbing unit of the reference electrode 1 is reduced, the effect of blocking the anions in the sample and outputting a stable reference potential can still be achieved.

Figure 2:
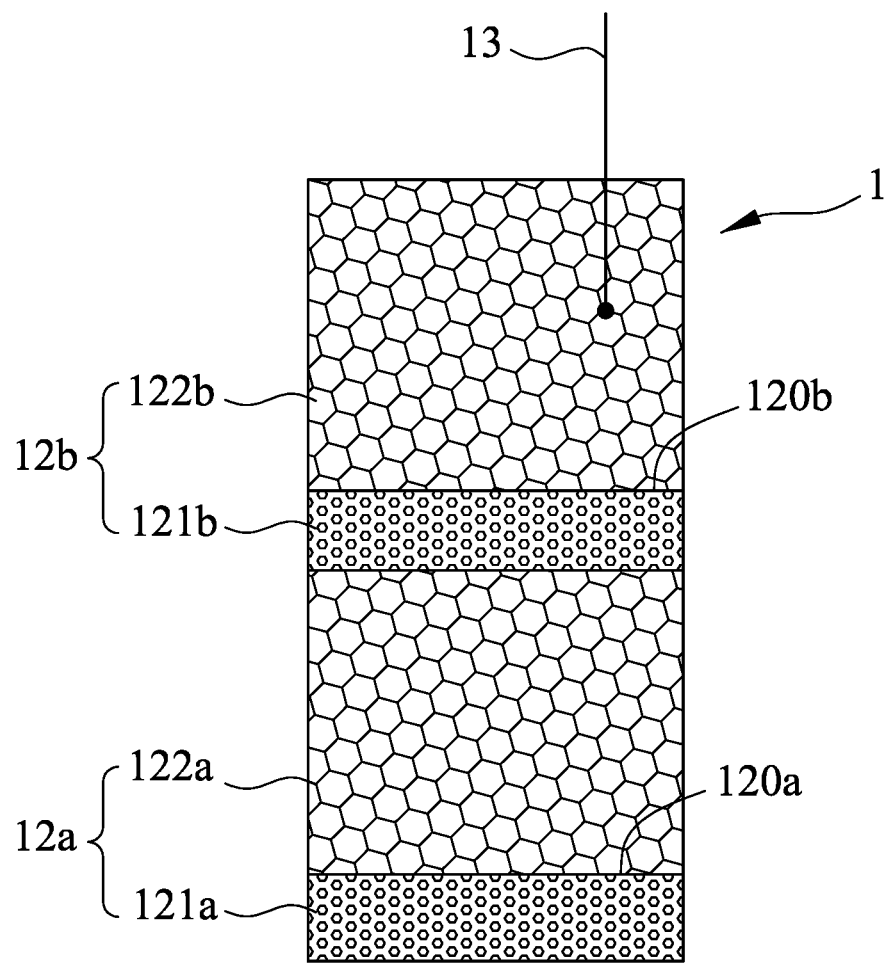
FIG. 2 is a sectional view of two water absorbing units and a sensing element of a reference electrode of a pH sensor according to the second embodiment of the present disclosure.

Referring to FIG. 2, the second embodiment of the pH sensor of this disclosure is identical to the first embodiment, and differs in the arrangement of the water absorbing units (12a, 12b) of the reference electrode 1. To clearly illustrate the arrangement of the water absorbing units (12a, 12b) of this embodiment, the glass electrode 2 is omitted in FIG. 2. In this embodiment, the junction members (121a, 121b) and the water absorbing members (122a, 122b) are stacked in an alternate manner. That is, the water absorbing member (122a) of the water absorbing unit (12a) is disposed on top of the junction member (121a), the junction member (121b) is disposed on top of the water absorbing member (122a), and the water absorbing member (122b) is disposed on top of the junction member (121b). Similarly, the junction member (121a) and the water absorbing member (122a) are in contact with each other at the interface (120a), the junction member (121b) and the water absorbing member (122b) are in contact with each other at the interface (120b), and the junction member (121b) is in contact with the top end of the water absorbing member (122a) at the interface (120c). With the water absorbing members (122a, 122b) cooperatively blocking the anions of the sample, the effect of prolonging the service life of the sensing element 13 can be achieved.

In summary, the water absorbing member (122a, 122b) of each water absorbing unit (12a, 12b) is made by soaking superabsorbent polymer (SAP) in potassium chloride solution. The superabsorbent polymer is polyacrylate or polyacrylamide.

Thus, by using the polyacrylate or polyacrylamide superabsorbent polymers to absorb potassium chloride solution and expand to form a jelly-like elastomer, the water absorbing members (122a, 122b) of the water absorbing units (12a, 12b) are elastic and soft, and can improve the tightness by its own elasticity, so that the water absorbing members (122a, 122b) can seal the gaps with the housing 111, the inner tube 112 and the glass electrode 2 to ensure the tightness with the same and reduce the tolerance problem during making and assembling of this disclosure. Thus, the assembly yield of this disclosure can be effectively improved, and the labor and material costs can be reduced. Simultaneously, because the superabsorbent polymers has the characteristics of high hydrophilicity and high water retention and insoluble in water, the water absorbing members (122a, 122b) can maintain an elastic solid state for a long time, thereby prolonging the service life of this disclosure. Finally, because the water absorbing members (122a, 122b) no longer absorb other ions, the impedance is low, the conveying speed is fast, the error in measurement is low, and the reaction speed is fast. Therefore, the drawbacks of the reference electrode described in the background can be effectively improved.

Furthermore, because the inner tube 112 can be supported inside the housing 111 through the tight abutment of the abutment portion 115 against the inner surface of the housing 111, and because the water absorbing members (122a, 122b) can be supported through cooperation of the support portion 114 of the inner tube 112 with the housing 111 and the glass electrode 2, the water absorbing members (122a, 122b) are prevented from being squeezed out or deformed due to an external force, and the sensing element 13 is prevented from being contaminated and from failure, so that the reference electrode 1 can provide a stable reference potential, and the water absorbing units (12a, 12b) of this disclosure can be stably assembled to the container unit (11). Additionally, by virtue of high water retention of the water absorbing members (122a, 122b), and in cooperation with the inner tube 112 to strengthen the overall structure, the service life of this disclosure can be prolonged. Therefore, the object of this disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

The invention claimed is:

1. A reference electrode of a pH sensor configured to contact a sample, comprising:
   a container unit including a hollow tubular housing; and
   two water absorbing units disposed in said tubular housing and connected to each other, each of said two water absorbing units including a porous junction member configured to contact the sample, and a water absorbing member disposed on one side of said porous junction member that is opposite to the sample, said porous junction member and said water absorbing member contacting each other at an interface, said water absorbing member being made from a superabsorbent polymer;
   wherein said porous junction members and said water absorbing members of said water absorbing units are arranged in an alternate manner, and said water absorbing members of said water absorbing units are not in contact with each other.

2. The reference electrode as claimed in claim 1, wherein said container unit further includes an inner tube disposed in said tubular housing.

3. The reference electrode as claimed in claim 2, wherein said porous junction member of one of said water absorbing units abuts against one side of said inner tube which faces the sample, said water absorbing member of said one of said water absorbing units being disposed in said inner tube, said porous junction member of the other one of said water absorbing units being disposed on a top end of said water absorbing member of said one of said water absorbing units, said water absorbing member of said other one of said water absorbing units being disposed between said inner tube and said tubular housing and being in contact with said porous junction member of said other one of said water absorbing units.

4. The reference electrode as claimed in claim 3, further comprising a sensing element that has one end inserted into said water absorbing member of said other one of said water absorbing units.

5. The reference electrode as claimed in claim 4, wherein said inner tube has a support portion extending in a same direction as said tubular housing, and an abutment portion extending radially and outwardly from a bottom side of said support portion and tightly abutting against an inner surface of said tubular housing.

6. The reference electrode as claimed in claim 1, wherein said container unit further includes a cover covering a top end of said housing.

7. The reference electrode as claimed in claim 1, wherein the superabsorbent polymer is polyacrylate or polyacrylamide.

8. A pH sensor for detecting a pH of a sample, comprising:
a reference electrode configured to contact a sample and including a container unit and at least one water absorbing unit, said container unit including a hollow tubular housing, said at least one water absorbing unit being disposed in said tubular housing and including a porous junction member configured to contact the sample, and a water absorbing member disposed on one side of said porous junction member that is opposite to the sample, said porous junction member and said water absorbing member contacting each other at an interface, said water absorbing member being made from a superabsorbent polymer; and
a glass electrode inserted into said water absorbing member of said at least one water absorbing unit and protruding from said junction member of said at least one water absorbing unit toward the sample.

9. The pH sensor as claimed in claim 8, wherein said at least one water absorbing unit includes two water absorbing units connected to each other, said porous junction members and said water absorbing members of said water absorbing units being arranged in an alternate manner, said water absorbing members being not in contact with each other.

10. The pH sensor as claimed in claim 9, wherein said container unit further includes an inner tube disposed in said tubular housing.

11. The pH sensor as claimed in claim 10, wherein said porous junction member of one of said water absorbing units abuts against one side of said inner tube which faces the sample, said water absorbing member of said one of said water absorbing units being disposed in said inner tube, said porous junction member of the other one of said water absorbing units being disposed on a top end of said water absorbing member of said one of said water absorbing units, said water absorbing member of said other one of said water absorbing units being disposed between said inner tube and said tubular housing and being in contact with said porous junction member of said other one of said water absorbing units.

12. The pH sensor as claimed in claim 11, further comprising a sensing element that has one end inserted into said water absorbing member of said other one of said water absorbing units.

13. The pH sensor as claimed in claim 12, wherein said inner tube has a support portion extending in a same direction as said tubular housing, and an abutment portion extending radially and outwardly from a bottom side of said support portion and tightly abutting against an inner surface of said tubular housing.

14. The pH sensor as claimed in claim 8, wherein said container unit further includes a cover covering a top end of said housing.

15. The pH sensor as claimed in claim 8, wherein the superabsorbent polymer is polyacrylate or polyacrylamide.

* * * * *